United States Patent [19]

Crerar et al.

[11] 3,974,263

[45] Aug. 10, 1976

[54] PROCESS FOR PRODUCING AMMONIUM PHOSPHATE IN TWO STAGES

[75] Inventors: John David Crerar; John David Crowther Hemsley; Ian Clive Hepworth, all of Felixstowe, England

[73] Assignee: Fisons Limited, London, England

[22] Filed: Jan. 10, 1975

[21] Appl. No.: 539,992

[30] Foreign Application Priority Data
Apr. 4, 1974    United Kingdom............... 14912/74

[52] U.S. Cl.................................... 423/313; 71/43; 423/310
[51] Int. Cl.².................. C01B 15/16; C01B 25/26
[58] Field of Search........................... 423/307–319; 71/43

[56] References Cited
UNITED STATES PATENTS

| | | | |
|---|---|---|---|
| 2,902,342 | 9/1959 | Kerley | 71/43 |
| 2,963,359 | 12/1970 | Moore et al. | 423/312 |
| 3,310,371 | 3/1967 | Lutz | 71/43 |
| 3,734,708 | 5/1973 | Burns | 423/313 |

*Primary Examiner*—Oscar R. Vertiz
*Assistant Examiner*—Gregory A. Heller
*Attorney, Agent, or Firm*—Wenderoth, Lind & Ponack

[57] ABSTRACT

The present invention relates to a two stage process for preparing ammonium phosphates in which ammonia at a comparatively low pressure and recovered from within the process of the invention is reacted with phosphoric acid in the liquid phase to yield an immediate product which is then ammoniated further in the second stage under elevated pressure.

8 Claims, No Drawings

PROCESS FOR PRODUCING AMMONIUM PHOSPHATE IN TWO STAGES

The present invention relates to a process for the production of ammonium phosphates.

It has been proposed to produce ammonium phosphates by reacting ammonia under pressure with phosphoric acid to produce a boiling solution or slurry of ammonium phosphate which is expelled into a zone of lower pressure where water is disengaged from the ammonium phosphate, e.g. by a spray drying technique, to give a solid particulate product. In this process the necessary heat to maintain the reaction mixture at its boiling point is provided by the heat of reaction.

Whilst this process may be readily adopted when a totally new plant is to be built, this may not be the case where an already existing plant for the production of ammonium phosphates at atmospheric pressure is to be modernised to take advantage of the improved technology of the pressure ammoniation process. Thus, the existing plant will incorporate many large items which are not suitable for use in the pressure process, e.g. the ammonia/phosphoric acid reactor vessels and the like. Merely to scrap such plant items may render adoption of the pressure process excessively costly.

Surprisingly, we have now found that the pressure ammoniation process may be carried out in two stages, an initial low pressure stage where phosphoric acid is ammoniated in the liquid phase with ammonia at low pressure recovered from elsewhere in the process, thus enabling one to use the plant items considered impractical for the high pressure process; followed by a pressure ammoniation step where the product from the first stage is ammoniated under higher pressure to give a boiling fluid ammonium phosphate which can be expelled into a zone at lower pressure to give a solid particulate product.

Despite the fact that the process has been split into two stages, we have found that the heats of reaction are usually sufficient to provide the boiling fluid ammonium phosphate required at the end of the pressure ammoniation step without the need to provide extra external heat. Furthermore, by carrying out the first stage of the process in the liquid phase, e.g. by bubbling the ammonia into phosphoric acid in a stirred reactor, we have found that this stage can be operated under a wide range of conditions and temperatures to give a hotter more concentrated intermediate product for use in the second stage than when other forms of first stage reactor, e.g. scurbbing towers, are used.

Accordingly, the present invention provides a process for producing ammonium phosphates which process comprises reacting in the liquid phase in a first stage phosphoric acid with ammonia obtained from the off-gases of the process to produce a partially ammoniated product; passing the reaction product from the first stage to a second stage where it is reacted with ammonia at a higher pressure to form a fluid ammonium phosphate and discharging this fluid ammonium phosphate into a zone of lower pressure; and recovering ammonia from the off-gases of the process for use in the first stage of the process.

The ammonia used in the first stage is that contained in the off-gases of the process, notably from the reactor used in the second reaction stage of the process of the invention. The ammonia may be used directly in the process of the invention without any deliberate intermediate purification step, apart from the removal of excessive quantities of water-vapour. If desired some ammonia from an external source may also be fed to the first stage of the process.

The phosphoric acid for use in the process of the invention may be thermal grade acid or wet process acid. Whilst this is not usually necessary, the latter type of acid may have been given a treatment to remove or sequester the major proportion of heavy metal and fluorine impurities therein. We prefer that the phosphoric acid contain at least 35% by weight of $P_2O_5$, e.g. from 38 to 60%, notably 44 to 52%, by weight of $P_2O_5$. Whilst orthophosphoric acid will usually be used in the process of the invention, the acid may contain appreciable quantities of linear or cyclic condensed phosphoric acid, e.g. polyphosphoric acid or metaphosphoric acids.

If desired, the phosphoric acid may be used in combination with up to 20% by weight of sulphuric acid. Alternatively, some sulphuric acid may be present in the phosphoric acid by virtue of its method of preparation. Furthermore, part or all of the phosphoric acid may contain some partially ammoniated phosphoric acid where the phosphoric acid has been used to recover ammonia losses from elsewhere in the process, e.g. in scrubbing the off-gases from the granulator or drier, before it is used in the process of the invention. For ease of handling it is preferred that such a partially ammoniated phosphoric acid have an $NH_3:H_3PO_4$ molar ratio in the ranges 0.1:1 to 0.6:1 or 1.2:1 to 1.45:1.

The reaction of the ammonia and the phosphoric acid in the first reaction stage is carried out in the liquid phase, as when ammonia gas is bubbled through phosphoric acid. A preferred method of operation is to react the ammonia and the phosphoric acid in a stirred reaction vessel and this vessel may be the reaction vessel originally used in an ammonium phosphate plant which is being modified to a high pressure process as outlined above.

The first reaction stage is usually carried out at from $-0.1$ to $+1.5$ $Kg/cm^2$ gauge, although ambient pressures may be used if desired, and without any external heating or cooling. The heat of reaction and/or the heat contained in the feed materials provides heat to bring the reaction mixture substantially to its boiling point. Depending upon the relative proportions of free phosphoric acid and ammonia fed to the reactor, further heat of reaction will be available to evaporate water from the reaction mixture. If desired, the phosphoric acid feed may be preheated to up to 90°C. The steam generated during the reaction is vented from the reaction vessel.

The reaction product from the first reaction stage is a hot solution or slurry of partially ammoniated phosphoric acid, i.e. ammonium phosphate, in water. It is preferred that the water content is in the range 10 to 45% by weight of the solution or slurry and is controlled to a large extent by the water content of the feed materials and also by the reaction conditions. In order that the solution or slurry be handleable, it is preferred that the ammonium phosphate therein have an $NH_3:H_3PO_4$ molar ratio of from 0.1:1 to 0.8:1, e.g. 0.2:1 to 0.7:1. However, it may be preferred to add part of the phosphoric acid to the second reaction stage, in which case the product from the first stage preferably has an $NH_3:H_3PO_4$ molar ratio of from 1.2:1 to 1.6:1.

The off-gases from the first stage will usually contain predominately water vapour with little or no $NH_3$ or $P_2O_5$ when the product from the first stage has an $NH_3$:$H_3PO_4$ molar ratio of less than 0.8:1 and may be discarded without the need to scrub the ammonia out of the off-gases. However, where the $NH_3$: $H_3PO_4$ molar ratio is higher, it will usually be necessary to scrub these off-gases with phosphoric acid to be used in the first reaction stage of the process of the invention, before they are discarded.

The hot solution or slurry from the first reaction stage is passed to a second reaction stage where it is reacted with further ammonia and possibly further phosphoric acid as indicated above. Sulphuric acid may also be included in the feed materials in order to increase the heat of reaction generated to aid removal of further water and to adjust the $NH_3$:$H_3PO_4$ molar ratio in the product from the second stage. This second stage is usually carried out at a higher pressure than the first stage, typically from 0.5 to 3.5 kg/cm$^2$, preferably 0.8 to 2.5 kg/cm$^2$, gauge and the solution or slurry from the first stage must therefore be pumped into the reaction vessel for the second stage. Whilst the ammonia for the second stage may be liquid, it is preferred to use substantially anhydrous gaseous ammonia, e.g. by gasification of liquid ammonia using hot air or steam, notably by vapourising liquid ammonia using the hot off-gases from the second stage reaction as detailed below.

The second reaction stage is carried out in a similar manner to the first stage, except at a higher pressure and temperature (typically 130° to 180°C depending upon the pressure used and the $NH_3$:$H_3PO_4$ molar ratios obtaining in the reaction vessel). It is preferred to carry out the second stage reaction by passing the ammonia through the solution or slurry in the bottom of a reaction vessel. The relative proportions of ammonia to solution or slurry used will depend upon the $NH_3$:$H_3PO_4$ molar ratio desired for the product. Typically, the product from the second stage will have an $NH_3$:$H_3PO_4$ molar ratio in the range 0.95:1 to 1.85:1, e.g. about 1:1 in the case of monammonium phosphate, or 1.35:1 to 1.65:1 in the case where the product is to be used in the production of granular ammonium phosphates (as indicated below).

The product from the second reaction stage is a hot fluid ammonium phosphate which is usually at its boiling point by virtue of the heat of reaction liberated. If desired, external heat may be provided to maintain the reaction mixture at its boiling point, although this will usually not be necessary. The off-gases from the reaction will contain steam liberated from the reaction mixture and ammonia which has not been absorbed. These off-gases are used as the source of ammonia for the first reaction stage. Where this is done, it will usually be desired to condense out at least a proportion of the water vapour in the off-gases in order to produce an ammonia enriched feed to the first stage. The condensation is conveniently achieved by passing the off-gases through a heat exchanger to heat and vapourise the liquid ammonia feed to the second stage. If desired, a further condenser may also be used to increase and/or control the total amount of water vapour which is condensed out of the off-gases. Condensed water is removed in a conventional separator before the off-gases are fed to the first stage.

The hot fluid leaving the reaction vessel from the second stage typically contains from 4 to 20% by weight of water. This hot fluid is passed to a zone at lower pressure, which is preferably at ambient pressure. Water may be removed from the fluid by a spray drying technique in which the hot fluid is sprayed into a void tower to form a solid powder ammonium phosphate directly containing from 2 to 11%, typically 5 to 8%, by weight of water. Alternatively, other solidification methods may be used. Thus, the hot fluid may be sprayed onto a belt to form a solid mass which is broken up into flakes or chips, or the hot fluid may be sprayed into a granulation device, such as a rotating drum or blunger device, onto a tumbling bed of particles to form a granular product. These particles may consist of recycled material and/or particles of other fertilizer ingredients (in which case the final product may be a granular mixed fertilizer). If desired, other fluid components may also be fed to the granulator, e.g. an aqueous solution or slurry of another fertilizer ingredient, such as a solution of amamonium nitrate. Where the hot fluid from the reaction stage is sprayed into a granulation device, ammonia may also be fed to the granulation device in order to increase the $NH_3$:$H_3PO_4$ molar ratio of the ammonium phosphate in the granulator. This method is particularly applicable to the production of granules containing ammonium phosphate of $NH_3$:$H_3PO_4$ molar ratios greater than 1.6:1, e.g. 1.7:1 to 2.1:1. The present invention therefore also provides a process wherein a hot fluid ammonium phosphate having an $NH_3$:$H_3PO_4$ molar ratio of less than 1.6:1 is produced by the first and second reaction stages of the process of the invention and this hot fluid is then sprayed onto a granulation device in which a bed of particles is being tumbled or agitated and to which ammonia is fed in order to raise the $NH_3$:$H_3PO_4$ molar ratio of the ammonium phosphate to a value greater than 1.6:1. In this process it may be advantageous to add free acid, e.g. phosphoric or sulphuric acid, to the granulation device.

Ammonia and/or particles of ammonium phosphate may be contained in the off-gases from the spray drying tower, the granulator and/or the granule drier. The ammonia values may be recovered, e.g. by scrubbing the off-gases with the phosphoric acid to be fed to the first and/or second stages of the process.

The process of the invention will be illustrated by the following Example in which all parts are by weight unless stated otherwise:

EXAMPLE 1

The process is carried out in a stirred tank reactor at ambient pressure and 115°C which discharges its product via a pump into a pressure reaction vessel operated at 0.85 kg/cm$^2$ gauge into which ammonia is fed. The off-gases from the pressure reaction are used to provide the whole of the free ammonia fed to the stirred tank reactor. The product from the pressure reaction is sprayed into a granulator to which ammonia is also fed, to form a granular diammonium phosphate product.

To the stirred tank reactor is fed phosphoric acid, part of which has been used to recover ammonia losses from the granulator and drier described later. The combined phosphoric acid and partially ammoniated acid have an overall $NH_3$:$H_3PO_4$ molar ratio of 0.2:1 and a temperature of 75°C. Sulphuric acid at 40°C is also fed to this reactor. Off-gas ammonia (at 112°C, 0.5 kg/cm$^2$ gauge and 9% $NH_3$) from the pressure reaction vessel is bubbled through the acids in the stirred tank to give a solution of ammonium phosphate having an $NH_3$:$H_3PO_4$ molar ratio of 0.26:1, at its boiling point of 115°C and a water content of 35%. This solution is pumped at a pressure of 4 kg/cm² gauge into the pressure reaction vessel into which is fed ammonia gas at 75°C obtained by vapourising liquid ammonia. The pressure reaction vessel is operated at 140°C and 0.85 kg/cm² gauge to give a boiling solution of ammonium phosphate having an $NH_3:H_3PO_4$ molar ratio of 1.45:1 and containing 12% water. The off-gases from the pressure reaction vessel contain 6% $NH_3$ in water vapour. These off-gases are passed through a heat exchanger to vapourise and heat the liquid ammonia feed to the pressure reaction vessel. As a result, the off-gases are cooled to 112°C and part of the water vapour is condensed out. The condensate is removed and the off-gases are recycled to the stirred tank reactor.

The boiling solution from the pressure reaction vessel is sprayed onto a tumbling bed of ammonium phosphate particles in a rotating drum granulator operated at ambient pressure and a temperature of 80° to 85°C. Liquid ammonia is fed also to the granulator by a sparger in the bed of particles. The product from the granulator is a granular ammonium phosphate having an $NH_3:H_3PO_4$ molar ratio of 1.8:1 and a water content of 3 to 3.5%. This product is then dried to 1 to 1.5% water and classified to yield product size granules and off-size granules which are recycled, after crushing of the oversize granules, to form part of the bed of particles in the granulator.

The off-gases from the granule cooler and the dust extraction system contain some ammonium phosphate particles, and the off-gases from the granulator and the drier contain ammonia and some ammonium phosphate particles. These off-gases are fed to a scrubber system where the ammonia and ammonium phosphate are scrubbed out with the phosphoric acid to be used on the feed to the stirred reactor of the first stage.

We claim:

1. A process for producing solid ammonium phosphates in two stages which process comprises reacting in the liquid phase in a first stage phosphoric acid containing from 35 to 60% by weight of $P_2O_5$ and up to 20% by weight of $H_2SO_4$ at a pressure of from −0.1 to +1.5 kg/cm² gauge with ammonia gas obtained from the ammonia-containing off-gases of the second stage of the process so as to produce a fluid ammonium phosphate product having an $NH_3:H_3PO_4$ molar ratio which varies from 0.1:1 to 1.45:1 and containing from 10 to 45% by weight of water; passing the said reaction product from the first stage to a second stage operating at higher pressure wherein the reaction product is reacted at a pressure of from 0.5 to 3.5 kg/cm² gauge with ammonia gas to form a fluid ammonium phosphate having an $NH_3:H_3PO_4$ molar ratio of from 0.95:1 to 1.85:1 and a water content of from 4 to 20% by weight; discharging this fluid ammonium phosphate into a zone at lower pressure so as to produce a solid ammonium phosphate containing from 2 to 11% by weight of water: and recovering ammonia values from the off-gases of the said second stage of the process for use as the major source of ammonia gas in the first state of the process.

2. A process as claimed in claim 1 wherein the first stage is carried out to give a fluid ammonium phosphate substantially at its boiling point and having a $NH_3H_3PO_4$ molar ratio of from 0.1:1 to 0.8:1.

3. A process as claimed in claim 1 wherein the product from the second stage is sprayed onto a tumbling bed of particles in a granulation device.

4. A two stage process for producing particulate ammonium phosphate which comprises reacting in a first ammoniation stage the off-gases from the second stage of the process with phosphoric acid containing at least 35% $P_2O_5$ in a stirred reactor at a pressure of from −0.1 to +1.5 kg/cm² gauge to give a fluid ammonium phosphate having an $NH_3:H_3PO_4$ molar ratio of from 0.1:1 to 0.8:1 and substantially at its boiling point; passing the fluid ammonium phosphate to a pressure reactor operated at from 0.5 to 3.5 kg/cm² gauge and at 130° to 180°C where it is reacted in a second ammoniation stage with gaseous ammonia to give a boiling fluid ammonium phosphate having an $NH_3:H_3PO_4$ molar ratio of from 0.95:1 to 1.85:1 and containing from 4 to 20% of water; expelling the fluid ammonium phosphate into a solidification zone at ambient pressure in which solid particles are formed; the off-gases from the second ammoniation stage being returned to the first ammoniation stage to provide the major part of the ammonia fed to the first stage.

5. A process as claimed in claim 4 wherein the solidification zone is a granulation device.

6. A process as claimed in claim 5 wherein the second ammoniation stage is carried out at an $NH_3:H_3PO_4$ molar ratio of from 0.95:1 to 1.6:1 and the fluid ammonium phosphate is expelled into a granulation device into which ammonia is also fed.

7. A process as claimed in claim 4 wherein the returned off-gases provide substantially all of the ammonia fed to the first ammoniation stage.

8. A process as claimed in claim 4 wherein the returned off-gases are passed in heat exchange contact with liquid ammonia so as to vapourise the liquid ammonia to provide gaseous ammonia for use in the second ammoniation stage and so as to condense out water from the off-gases before they are fed to the first ammoniation stage.

* * * * *